(12) United States Patent
Noro et al.

(10) Patent No.: US 10,829,580 B2
(45) Date of Patent: Nov. 10, 2020

(54) NONCOVALENT SOFT ELASTOMER AND METHOD FOR MANUFACTURING THE SAME

(71) Applicant: NATIONAL UNIVERSITY CORPORATION TOKAI NATIONAL HIGHER EDUCATION AND RESEARCH SYSTEM, Nagoya (JP)

(72) Inventors: Atsushi Noro, Nagoya (JP); Maho Ohno, Nagoya (JP)

(73) Assignee: NATIONAL UNIVERSITY CORPORATION TOKAI NATIONAL HIGHER EDUCATION AND RESEARCH SYSTEM, Nagoya (JP)

( * ) Notice: Subject to any disclaimer, the term of this patent is extended or adjusted under 35 U.S.C. 154(b) by 0 days.

(21) Appl. No.: 15/573,116

(22) PCT Filed: Apr. 27, 2016

(86) PCT No.: PCT/JP2016/063152
§ 371 (c)(1),
(2) Date: Nov. 9, 2017

(87) PCT Pub. No.: WO2016/181834
PCT Pub. Date: Nov. 17, 2016

(65) Prior Publication Data
US 2019/0077899 A1  Mar. 14, 2019

(30) Foreign Application Priority Data
May 11, 2015 (JP) .................................. 2015-096442

(51) Int. Cl.
*C08F 293/00* (2006.01)
*C08L 53/00* (2006.01)
(Continued)

(52) U.S. Cl.
CPC ............ *C08F 293/005* (2013.01); *C08K 5/06* (2013.01); *C08K 5/3445* (2013.01); *C08L 53/00* (2013.01);
(Continued)

(58) Field of Classification Search
None
See application file for complete search history.

(56) References Cited

U.S. PATENT DOCUMENTS 6,383,500 B1    5/2002  Wooley et al.
2010/0120985 A1  5/2010 Konishi et al.
(Continued)

FOREIGN PATENT DOCUMENTS

JP  2000-514791 A  11/2000
JP  2008-239854 A  10/2008
(Continued)

OTHER PUBLICATIONS

Kyosung Hwang, Dongwoo Kwak, Changjoon Kang, Daihyun Kim, Youshin Ahn, and Youngjong Kang. "Electrically Tunable Hysteretic Photonic Gels for Nonvolatile Display Pixels". Angew. Chem. Int. Ed. 2011, 50(28), 6311-6314. (Year: 2011).*
(Continued)

Primary Examiner — Richard A Huhn
(74) Attorney, Agent, or Firm — Oliff PLC (57) ABSTRACT

A noncovalent soft elastomer includes a binary block copolymer composed of an A block and a B block and a solvent, wherein the B block has a noncovalent-bonding functional group, and the solvent is a nonvolatile liquid which has a property of dissolving the B block but not dissolving the A block and which forms a functional group capable of noncovalent-bonding of the B block.

10 Claims, 5 Drawing Sheets

(51) Int. Cl.

| | |
|---|---|
| *C08K 5/053* | (2006.01) |
| *C08K 5/06* | (2006.01) |
| *C08K 5/3445* | (2006.01) |
| *C08L 101/14* | (2006.01) |
| *C08K 3/16* | (2006.01) |
| *C08F 20/06* | (2006.01) |
| *C08F 26/06* | (2006.01) |
| *C08L 53/02* | (2006.01) |
| *C08F 12/14* | (2006.01) |
| *C08F 20/56* | (2006.01) |
| *C08F 20/20* | (2006.01) |
| *C08F 36/14* | (2006.01) |
| *C08F 20/12* | (2006.01) |
| *C08K 5/05* | (2006.01) |
| *C08F 12/08* | (2006.01) |
| *C08F 10/00* | (2006.01) |

(52) U.S. Cl.
CPC ............ *C08L 101/14* (2013.01); *C08F 10/00* (2013.01); *C08F 12/08* (2013.01); *C08F 12/14* (2013.01); *C08F 20/06* (2013.01); *C08F 20/12* (2013.01); *C08F 20/20* (2013.01); *C08F 20/56* (2013.01); *C08F 26/06* (2013.01); *C08F 36/14* (2013.01); *C08F 2438/03* (2013.01); *C08K 5/05* (2013.01); *C08K 5/053* (2013.01); *C08K 2003/168* (2013.01); *C08K 2201/002* (2013.01); *C08L 53/025* (2013.01); *C08L 2207/00* (2013.01); *C08L 2666/34* (2013.01); *C08L 2666/68* (2013.01); *Y02P 20/54* (2015.11)

(56) References Cited

U.S. PATENT DOCUMENTS

| | | |
|---|---|---|
| 2014/0378592 A1 | 12/2014 | Trefonas, III et al. |
| 2016/0187536 A1* | 6/2016 | Noro .................... C08K 5/19 |
| | | 252/582 |

FOREIGN PATENT DOCUMENTS

| | | | |
|---|---|---|---|
| JP | 2015-7233 | 1/2015 | |
| JP | 2016-89099 A | 5/2016 | |
| WO | 2014/185426 A1 | 11/2014 | |
| WO | WO-2014185426 A1 * | 11/2014 | ............... C08K 5/34 |

OTHER PUBLICATIONS

Fan Zhang. Photon Upconversion Nanomaterials. Springer, Dec. 11, 2014. (Year: 2014).*
MEGlobal, Diethylene Glycol Product Guide. 2005. (Year: 2005).*
Nov. 18, 2018 Extended Search Report issued in European Patent Application No. 16792559.3.
He et al; "Ion Gels by Self-Assembly of a Triblock Copolymer in an Ionic Liquid;" J. Phys. Chem. B.; vol. 111, No. 18; pp. 4645-4652; 2007.
Hwang et al; "Electrically Tunable Hysteretic Photonic Gels for Nonvolatile Display Pixels;" Angew. Chem. Int. Ed.; vol. 50, No. 28; pp. 6311-6314; May 2011.
Hayashi, Mikihiro et al., "Preparation of supramolecular soft materials composed of ABA triblock copolymer and a multi-functionalized cross-linker," 63rd SPSJ Annual Meeting, Polymer Preprints vol. 63, No. 1, May 9, 2014.
Matsushima Satora et al., "Preparation and mechanical properties of soft materials composed of ABA triblock copolymer/iconic liquid," Polymer preprints, 64, 1, 2015.
Ohno Maho et al., "Electro-Responsiveness of Soft Photonic Films Composed of Block Copolymer/Protic Solvent," Polymer preprints, 64, 2, 2015.
Hayashi Mikihiro et al., "Mechanical Property Enhancement of ABA Block Copolymer-Based Elastomers by Incorporating Transient Cross-Links into Soft Middle Block," Macromolecules vol. 48, pp. 421-431, 2015.
Henderson Kevin et al., "Ionically Cross-Linked Triblock Copolymer Hydrogels with High Strength," Macromolecules, vol. 43, pp. 6193-6201, 2010.
Jul. 5, 2016 Search Report issued in International Patent Application No. PCT/JP2016/063152.
Jul. 5, 2016 Written Opinion issued in International Patent Application No. PCT/JP2016/063152.
Noro Atsushi et al., "Effect of Molecular Weight Distribution on Microphase-Separated Structures from Block Copolymers," Macromolecules 2005, 38, 4371-4376.

* cited by examiner

NONCOVALENT SOFT ELASTOMER AND METHOD FOR MANUFACTURING THE SAME

TECHNICAL FIELD

The present invention relates to a noncovalent soft elastomer and a method for manufacturing the same.

BACKGROUND ART

High-molecular-weight materials are involved in the everyday lives of people and are materials indispensable in various fields. Among the high-molecular-weight materials, high-molecular-weight gels (polymer gels), elastomers, and the like may be materials having flexibility at ambient temperature. Here, polymer gels are soft materials in which a high-molecular-weight chain forms a network and entraps a solvent. Usually, this material does not have extensibility and, therefore, is brittle because a large amount of solvent is included. Meanwhile, the elastomer has a polymer chain network in the same manner as the polymer gel but is a soft material in which no solvent is included and the network chain is in a molten state at room temperature so as to exhibit rubber elasticity. Among elastomers, those which show fluidity on heating and show elastomeric behavior on cooling are called thermoplastic elastomers. An ABA triblock copolymer in which an A block is in a glass state at room temperature and a B block is in a molten state at room temperature is a typical thermoplastic elastomer.

Recently, in order to improve the mechanical properties of the thermoplastic elastomer composed of an ABA triblock copolymer, research on the introduction of noncovalent (hydrogen bond, ionic bond, or the like) pseudo-cross-linking has been performed. Pseudo-cross-linking due to the noncovalent bond can also be called supermolecular cross-linking or soft cross-linking because of weak temporary cross-linking. An elastomer incorporated with such supermolecular cross-linking can be called a supermolecular elastomer (or simply a noncovalent elastomer).

The present inventors noted a B middle block of an ABA triblock copolymer, produced on the basis of self-organization of the ABA triblock copolymer a supermolecular elastomer, in which a self-complementary hydrogen-bonding functional group was introduced into the molten B middle block, and reported the mechanical properties thereof (for example, refer to NPLs 1 and 2). It was ascertained from tensile measurement of the supermolecular elastomer that the toughness and the elongation at break after the introduction of the functional group increased compared with those before the introduction of the functional group.

There is also an example of a research report on the preparation of an aqueous polymer gel (hydrogel), in which the B middle block of the ABA triblock copolymer was noted (refer to, for example, NPL 3). In NPL 3, a hydrogel having extensibility was prepared by dipping a hydrogel composed of an ABA triblock copolymer having a water-soluble B middle block into an aqueous solution of a metal salt. The prepared hydrogel had extensibility in spite of a low modulus of elasticity because supermolecular cross-linking occurred due to an ionic interaction between the B middle block and a divalent metal ion in the water. The resulting hydrogel could realize a low modulus of elasticity that was not realized by the elastomer and, therefore, was considered to be utilizable as a new dynamic material different from the elastomer.

CITATION LIST

Non Patent Literature

NPL 1: "Preparation of supermolecular soft materials composed of ABA triblock copolymer and a multi-functionalized cross-linker", the 63rd SPSJ Annual Meeting, Polymer Preprints Vol. 63, No. 1, issued on May 9, 2014 (Society of Polymer Science, Japan)

NPL 2: Macromolecules, Vol. 48, pp. 421-431, 2015

NPL 3: Macromolecules, Vol. 43, pp. 6193-6201, 2010

SUMMARY OF INVENTION

Technical Problem

However, preparation of the hydrogel according to NPL 3 was based on the use of a metal salt, the solvent being limited to only water, and only a water-soluble polymer being used. Further, for preparation of a sample, preparation of a hydrogel by vapor phase solvent exchange and dipping into a metal salt aqueous solution had to be performed and, therefore, a complex procedure had to be performed.

The present invention was realized so as to solve such problems, and the main object is to provide a noncovalent soft elastomer which is not altered by solvent vaporization and which has a low modulus of elasticity and high extensibility.

Solution to Problem

In order to achieve the above-described object, the present inventors found that a noncovalent soft elastomer having a low modulus of elasticity and high extensibility could be produced by dissolving a binary block copolymer composed of polystyrene-b-poly(4-vinylpyridine)-b-polystyrene (ABA triblock copolymer) and tetraethylene glycol into a volatile diluent capable of dissolving both and, thereafter, performing casting and vacuum drying. Consequently, the present invention was realized.

That is, a noncovalent soft elastomer according to the present invention includes a block copolymer having an A block and a B block and a solvent, wherein the B block has a noncovalent-bonding functional group, and the solvent is a nonvolatile liquid which has a property of dissolving the B block but not dissolving the A block and which forms a functional group capable of noncovalent-bonding of the B block.

Advantageous Effects of Invention

Figure 1:
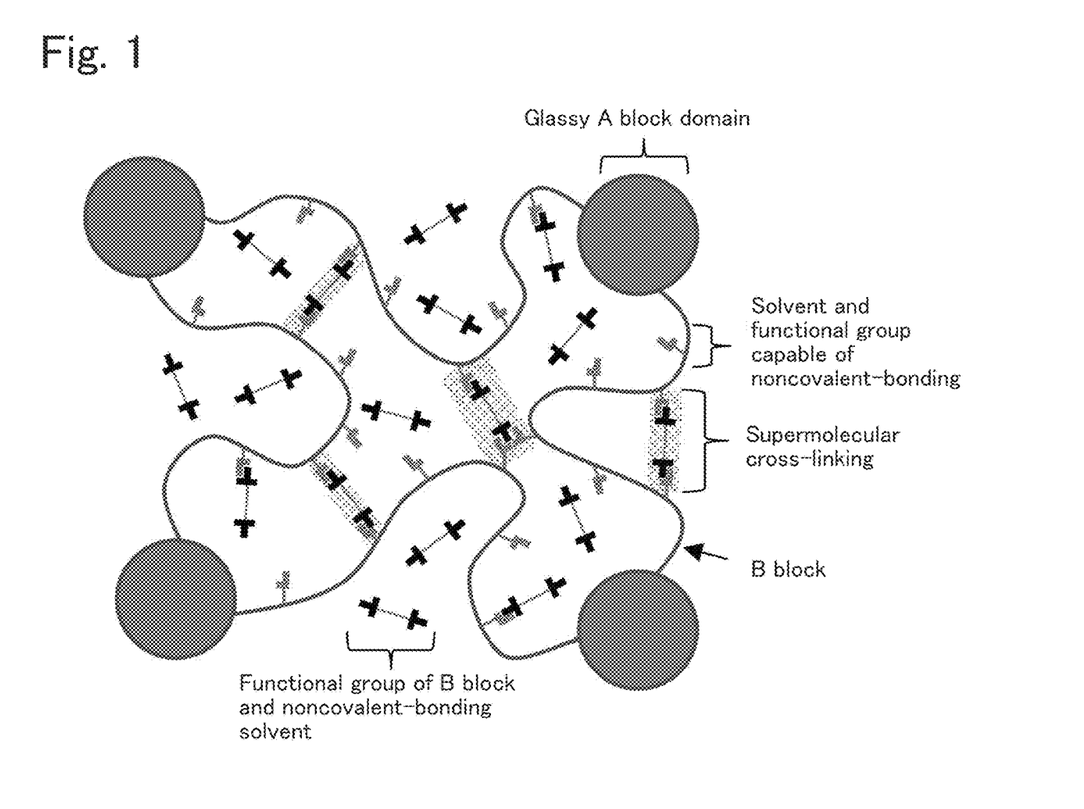
FIG. 1 is a schematic diagram of an example of a noncovalent soft elastomer according to the present invention.

The noncovalent soft elastomer according to the present invention functions as a solvent, in which the functional group of the B block in the block copolymer that has the A block and the B block and the nonvolatile liquid form a supermolecular cross-link by a noncovalent bond. Therefore, low modulus of elasticity is shown while high extensibility is provided. In addition, the noncovalent soft elastomer contains a nonvolatile liquid, e.g., an alcohol-based solvent or an ionic liquid. These are solvents having a low vapor pressure and do not easily vaporize. As a result, alteration due to solvent vaporization is hardly observed. In this regard, FIG. 1 is a schematic diagram of an example of a noncovalent soft elastomer according to the present invention.

DESCRIPTION OF EMBODIMENTS

A noncovalent soft elastomer according to the present invention includes a block copolymer having an A block and a B block and a solvent, wherein the B block has a noncovalent-bonding functional group, and the solvent is a nonvolatile liquid, e.g., an alcohol-base solvent or an ionic liquid, which has a property of dissolving the B block but not dissolving the A block and which forms a functional group capable of noncovalent-bonding of the B block.

In the present specification, "soft elastomer" is defined as a material having a modulus of elasticity lower than the modulus of elasticity of a common elastomer, that is, ultimately having a combination of flexibility such as the flexibility of a polymer gel and having extensibility such as the extensibility of an elastomer.

It is desirable that the A block be a polymer having a glass transition temperature (Tg) of 35° C. or higher. There is no particular limitation regarding the A block and, for example, polystyrenes, polyacrylic acid esters, polymethacrylic acid esters, and polyolefins are preferable. In particular, examples of polystyrenes include polystyrene, polyacetylstyrene, polyanisoylstyrene, polybenzoylstyrene, polybiphenylstyrene, polybromoethoxystyrene, polybromomethoxystyrene, polybromostyrene, polybutoxymethylstyrene, poly-tert-butylstyrene, polybutyrylstyrene, polychlorofluorostyrene, polychloromethylstyrene, polychlorostyrene, polycyanostyrene, polydichlorostyrene, polydifluorostyrene, polydimethylstyrene, polyethoxymethylstyrene, polyethoxystyrene, polyfluoromethylstyrene, polyfluorostyrene, polyiodostyrene, polymethoxycarbonylstyrene, polymethoxymethylstyrene, polymethylstyrene, polymethoxystyrene, polyperfluorostyrene, polyphenoxystyrene, polyphenylacetylstyrene, polyphenylstyrene, polypropoxystyrene, polytoluoylstyrene, and polytrimethylstyrene. Examples of polyacrylic acid esters include polyadamantyl acrylate, poly-tert-butyl acrylate, poly-tert-butylphenyl acrylate, polycyanoheptyl acrylate, polycyanohexyl acrylate, polycyanomethyl acrylate, polycyanophenyl acrylate, polyfluoromethyl acrylate, polymethoxycarbonylphenyl acrylate, polymethoxyphenyl acrylate, polynaphthyl acrylate, polypentachlorophenyl acrylate, and polyphenyl acrylate. Examples of polymethacrylic acid esters include polymethyl methacrylate, polyethyl methacrylate, polymethacrylonitrile, polyadamantyl methacrylate, polybenzyl methacrylate, poly-tert-butyl methacrylate, poly-tert-butylphenyl methacrylate, polycycloethyl methacrylate, polycyanoethyl methacrylate, polycyanomethylphenyl methacrylate, polycyanophenyl methacrylate, polycyclobutyl methacrylate, polycyclodecyl methacrylate, polycyclododecyl methacrylate, polycyclobutyl methacrylate, polycyclohexyl methacrylate, polycyclooctyl methacrylate, polyfluoroalkyl methacrylate, polyglycidyl methacrylate, polyisobornyl methacrylate, polyisobutyl methacrylate, polyphenyl methacrylate, polytrimethylsilyl methacrylate, and polyxylenyl methacrylate. Examples of polyolefins include polyethylene, polypropylene, and polyα-olefin.

The B block has a noncovalent-bonding functional group. Noncovalent bonds include a hydrogen bond, a coordination bond, and an ionic bond. Preferably, the B block includes a portion produced by polymerizing a monomer having a noncovalent-bonding functional group. There is no particular limitation regarding the B block, and polyvinylpyridines (the functional group is a pyridyl group), poly(meth)acrylic acids (the functional group is a COOH group), polyacrylamides (the functional group is a CONHR group, where R represents a hydrogen group or a substituent (for example, an alkyl group or the like)), polyhydroxyalkyl (meth)acrylates (the functional group is a OH group), and the like are preferable. Examples of polyvinylpyridines include poly(2-vinylpyridine), poly(3-vinylpyridine), and poly(4-vinylpyridine). Examples of polyhydroxyalkyl (meth)acrylates include poly(2-hydroxyethyl methacrylate), poly(hydroxymethyl methacrylate), poly(2-hydroxyethyl acrylate), poly(hydroxymethyl acrylate), poly(hydroxypropyl methacrylate), and poly(hydroxypropyl acrylate). In addition, the B block may be a derivative which is soluble in nonvolatile noncovalent solvents due to the introduction of a noncovalent-bonding functional group into polystyrenes, polydienes, polyolefins, and the like, that is, polystyrene derivatives, polydiene derivatives, polyolefin derivatives, and the like which are dissolved in nonvolatile noncovalent solvents. Also, the B block may be a random copolymer of a monomer having a noncovalent-bonding functional group and a monomer not having such a functional group.

The solvent is a nonvolatile solvent, e.g., an alcohol-based solvent or an ionic liquid, which has a property of dissolving the B block but not dissolving the A block and which forms a functional group capable of noncovalent-bonding of the B block. The alcohol-based solvent or the ionic solvent which has a sufficiently low vapor pressure (1 mmHg or less) and which is liquid at ambient temperature (any temperature of 10° C. to 50° C.) and normal pressure (any pressure of 950 to 1,100 hPa) is used. Whether or not the solvent dissolves the A block is determined in the manner described below, for example. That is, the same polymer as the A block is prepared, the polymer and the solvent are weighed such that the mass ratio of the polymer to the solvent becomes a predetermined ratio (for example, 1:9) and are dissolved into a volatile diluent that can dissolve the polymer and the solvent. The state after the diluent is vaporized is visually observed. Then, a cloudy state is judged to be insoluble, and a transparent state is judged to be soluble. The same applies to the B block. In this regard, examples of volatile diluents include THF and a mixed solution of THF and alcohol.

The nonvolatile liquid is preferably a nonvolatile protonic solvent. In particular, an alcohol-based solvent and an ionic liquid are preferable.

Examples of alcohol-based solvents include glycol-based solvents, monoalcohol-based solvents, diol-based solvents, and polyol-based solvents. The glycol-based solvent is preferably a dimer to tricontamer of alkylene glycol, and more preferably a dimer to decamer of alkylene glycol. The alkylene glycol is preferably ethylene glycol, propylene glycol, or the like. Specific examples include diethylene glycol, triethylene glycol, tetraethylene glycol, pentaethylene glycol, hexaethylene glycol, dipropylene glycol, tripropylene glycol, tetrapropylene glycol, pentapropylene glycol, and hexapropylene glycol. Examples of monoalcohol-based solvents include 1-hexanol, 2-hexanol, 3-hexanol, 1-heptanol, 2-heptanol, 3-heptanol, 4-heptanol, 1-octanol, 2-octanol, 3-octanol, 4-octanol, 1-nonanol, 2-nonanol, 3-nonanol, 4-nonanol, 5-nonanol, 1-decanol, 2-decanol, 3-decanol, 4-decanol, 5-decanol, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, diethylene glycol monomethyl ether, triethylene glycol monomethyl ether, and tetraethylene glycol monomethyl ether. Examples of diol-based solvents include 1,3-propanediol, 1,4-butanediol, 1,2-butanediol, 2,3-butanediol, 1,3-butanediol, 1,5-pentanediol, 1,2-pentanediol, 1,3-pentanediol, 1,4-pentanediol, 2,3-pentanediol, 1,6-hexanediol, 1,2-hexanediol, 1,3-hexanediol, 1,4-hexanediol, 1,5-hexanediol, 2,3-hexanediol, 2,4-hexanediol, 2,5-hexanediol, 1,7-heptanediol, 1,2-heptanediol, 1,3-heptanediol, 1,4-heptanediol, 1,5-heptanediol, 1,6-heptanediol, 2,3-heptanediol, 2,4-heptanediol, 2,5-heptanediol, 2,6-heptanediol, 3,4-heptanediol, and 3,5-heptanediol. Examples of polyol-based solvents include 1,2,3-propanetriol (glycerin), 1,2,3-butanetriol, and 1,2,4-butanetriol.

The ionic liquid is preferably a protonic ionic liquid. Examples of protonic ionic liquids include an ionic liquid composed of a salt of a nitrogen-containing hetero ring having a proton on the nitrogen of a nitrogen-containing hetero ring and an ionic liquid of an ammonium salt having a proton on the nitrogen of an organic amine. In this regard, examples of the former ionic liquid include an imidazolium salt, a triazolium salt, a pyridinium salt, and a pyrrolidinium salt. In particular, an imidazolium salt, a triazolium salt, and a pyridinium salt are preferable. Examples of the latter ionic liquid include an alkyl ammonium salt. Examples of imidazolium salts include a bis(trifluoromethylsulfonyl)imide (TFSI) salt and a bis(pentafluoroethanesulfonyl)imide (BETI) salt of imidazolium, an acetic acid salt, a hexafluorophosphoric acid ($PF_6$) salt, a TFSI salt, and a BETI salt of 1-methylimidazolium, a trifluoromethanesulfonic acid (TfO) salt, a TFSI salt, a BETI salt, and a perchloric acid salt of 1-ethylimidazolium, a TfO salt, a TFSI salt, a BETI salt, and a perchloric acid salt of 1-butylimidazolium, a TfO salt, a TFSI salt, a BETI salt, and a perchloric acid salt of 1-ethyl-2-methylimidazolium, and a TFSI salt and a BETI salt of 1,2-dimethylimidazolium. Examples of triazolium salts include a TFSI salt of 1,2,4-triazolium. Examples of pyridinium salts include a trifluoroacetic acid (TFA) salt of 2-methylpyridinium. Examples of pyrrolidinium salts include a nitric acid salt and a phenolcarboxylic acid salt of 2-pyrrolidonium. Examples of alkylammonium salts include a nitric acid salt of ethylammonium, a TFA salt and a nitric acid salt of propyl ammonium, a thiocyanic acid salt and a TFSI salt of butyl ammonium, a TfO salt of tert-butylammonium, a tetrafluoroboronic acid ($BF_4$) salt of ethanol ammonium, a TFSI salt and a $BF_4$ salt of alanine methyl ester, a nitric acid salt of alanine ethyl ester, a nitric acid salt of isoleucine methyl ester, a nitric acid salt of threonine methyl ester, a nitric acid salt of proline methyl ester, a nitric acid salt of bis(proline ethyl ester), a butyric acid salt of 1,1,3,3-tetramethylguanidium, a thiocyanic acid salt of dipropylammonium, a nitric acid salt of dipropylammonium, a thiocyanic acid salt of 1-methylpropylammonium, a TFSI salt of triethylammonium, a methanesulfonic acid salt of triethylammonium, a nitric acid salt of tributylammonium, and a sulfonic acid salt of dimethylethylammonium.

In the noncovalent soft elastomer according to the present embodiment, the block copolymer is preferably the AB and/or ABA block copolymer. The average degree of polymerization of the entire block copolymer is preferably 100 to 100,000. It is not preferable that the average degree of polymerization of the entire block copolymer be less than the lower limit because sufficient material strength is not obtained, and it is not preferable that the average degree of polymerization be more than the upper limit because synthesis becomes difficult or breakage of the molecular chain easily occurs. The average degree of polymerization of the entire block copolymer is more preferably 1,000 to 100,000, and particularly preferably 5,000 to 100,000. The average degree of polymerization of the A block is preferably 20 to 20,000 in the case of the ABA triblock copolymer and 40 to 40,000 in the case of the AB diblock copolymer. It is not preferable that the average degree of polymerization of the A block be less than the lower limit because a glassy domain is not easily formed, and it is not preferable that the average degree of polymerization be more than the upper limit because soft elastomer properties are not easily obtained. The average degree of polymerization of the A block is more preferably 200 to 20,000 in the case of the ABA triblock copolymer, and particularly preferably 1,000 to 20,000. The average degree of polymerization of the A block is more preferably 400 to 40,000 in the case of the AB diblock copolymer, and particularly preferably 2,000 to 40,000. The average degree of polymerization of the B block is preferably 60 to 60,000. It is not preferable that the average degree of polymerization of the B block be less than the lower limit because sufficient material strength is not obtained, and it is not preferable that the average degree of polymerization be more than the upper limit because synthesis becomes difficult. The average degree of polymerization of the B block is more preferably 600 to 60,000, and particularly preferably 3,000 to 60,000. In the case of the ABA triblock copolymer, the ratio of the average degree of polymerization of an A block at one end to the average degree of polymerization of a B block in the middle to the average degree of polymerization of an A block at the other end is preferably 5-30:90-40:5-30. It is not preferable to fall outside this range because there is a concern that the entire copolymer may become glassy or may fluidize without forming a soft elastomer. In the case of the AB diblock copolymer, the ratio of the average degree of polymerization of the A block to the average degree of polymerization of the B block is preferably 10-60:90-40. It is not preferable to fall outside this range because there is a concern that the entire copolymer may become glassy or may fluidize without forming a soft elastomer. Incidentally, the noncovalent soft elastomer according to the present embodiment may be produced by blending the block copolymers including the A block and the B block or may include an A block homopolymer and a B block homopolymer in addition to the above-described block copolymer.

The noncovalent soft elastomer according to the present embodiment may contain a metal salt, and functional groups in a plurality of B blocks may form coordination bonds with metal ions in the metal salt so as to form supermolecular cross-links of block copolymers. There is no particular limitation regarding the metal salt, and the metal salt may be a halide, a nitric acid salt, a sulfuric acid salt, a carbonic acid salt, an acetic acid salt, a phosphoric acid salt, a hypochlorous acid salt, a chloric acid salt, a butyric acid salt, a thiocyanic acid salt, a TFSI salt, a BETI salt, a TfO salt, a $PF_6$ salt, a TFA salt, a $BF_4$ salt, a methanesulfonic acid salt, and the like. Examples include zinc chloride, lithium chloride, sodium chloride, potassium chloride, calcium chloride, magnesium chloride, copper chloride, iron chloride, cobalt chloride, nickel chloride, lithium nitrate, sodium nitrate, potassium nitrate, calcium nitrate, magnesium nitrate, nickel nitrate, manganese nitrate, zinc sulfate, lithium sulfate, sodium sulfate, potassium sulfate, copper sulfate, iron sulfate, cobalt sulfate, nickel sulfate, zinc carbonate, lithium carbonate, sodium carbonate, potassium carbonate, calcium carbonate, magnesium carbonate, copper carbonate, iron carbonate, cobalt carbonate, nickel carbonate, zinc acetate, lithium acetate, sodium acetate, potassium acetate, calcium acetate, magnesium acetate, copper acetate, iron acetate, cobalt acetate, nickel acetate, zinc phosphate, lithium phosphate, sodium phosphate, potassium phosphate, calcium phosphate, magnesium phosphate, copper phosphate, iron phosphate, cobalt phosphate, nickel phosphate, zinc butyrate, lithium butyrate, sodium butyrate, potassium butyrate, calcium butyrate, magnesium butyrate, copper butyrate, iron butyrate, cobalt butyrate, nickel butyrate, lithium TFSI, sodium TFSI, potassium TFSI, lithium BETI, sodium BETI, potassium BETI, lithium TfO, sodium TfO, potassium TfO, lithium $PF_6$, sodium $PF_6$, potassium $PF_6$, lithium TFA, sodium TFA, potassium TFA, lithium $BF_4$, sodium $BF_4$, potassium $BF_4$, lithium TFA, sodium TFA, potassium TFA, lithium methanesulfonate, sodium methanesulfonate, and potassium methanesulfonate.

The noncovalent soft elastomer according to the present embodiment can be produced by a manufacturing method including (a) a step of synthesizing a block copolymer having an A block and a B block, the B block having a noncovalent-bonding functional group, and (b) a step of preparing a nonvolatile liquid serving as a solvent which has a property of dissolving the B block but not dissolving the A block and which forms a functional group capable of noncovalent-bonding of the B block and mixing the solvent and the block copolymer. For example, the noncovalent soft elastomer can be produced by synthesizing the block copolymer by living radical polymerization or living anion polymerization, adding the block copolymer and a nonvolatile liquid to a volatile diluent so as to form a solution, and thereafter, removing the diluent. Regarding the living radical polymerization, for example, RAFT (reversible addition fragmentation chain transfer) polymerization can be utilized. In such a case, initially, a monomer serving as a raw material for the A block is polymerized by RAFT polymerization. A known RAFT agent can be used for the RAFT polymerization. RAFT polymerization may be performed at a high pressure (for example, 30 to 500 MPa, and preferably 100 to 400 MPa) or at normal pressure (for example, 950 to 1,100 hPa). When pressurization is performed, preferably, hydrostatic pressure is applied. The reaction time and the reaction temperature may be appropriately set, and may be set within the range of, for example, 1 to 24 hours and 60° C. to 100° C. A radical initiator, e.g., AIBN, AAPH, or ACVA, may be added as necessary. Also, a solvent, e.g., a halogenated alkane, an aromatic hydrocarbon, an aliphatic hydrocarbon, DMF, DMSO, or THF, may be used as necessary. The RAFT agent introduced into the thus produced A block also serves as the RAFT agent. Subsequently, the A block, into which the RAFT agent has been introduced, and a monomer (for example, a monomer having a noncovalent-bonding functional group) constituting the B block are mixed and subjected to RAFT polymerization and, as a result, a block copolymer that is a precursor of the noncovalent soft elastomer according to the present embodiment can be produced. The conditions (pressure, reaction time, reaction temperature, and the like) for the RAFT polymerization at this time may be set in the same manner as in the synthesis of the A block. In addition, a radical initiator may be added, and a solvent may be used as necessary. When living anionic polymerization is utilized, there is a cost advantage compared with the RAFT polymerization because the RAFT agent is not used and the price is reduced accordingly.

In this regard, the present invention is not limited to the above-described embodiment and, as a matter of course, the present invention can be realized in various situations within the technical scope of the present invention.

EXAMPLES

Example 1

[1] Synthesis

In example 1, in accordance with the following formula, polystyrene-b-poly(4-vinylpyridine)-b-polystyrene (referred to as SPS triblock copolymer) was synthesized as the ABA triblock copolymer (first and second steps), and the resulting copolymer was dissolved and subjected to supermolecular cross-linking by TEG so as to prepare a soft elastomer (third step). In this regard, S (A block) at both ends of SPS is a symbol that represents polystyrene, and P (B block) in the middle is a symbol that represents poly(4-vinylpyridine).

[Chem. 1]

[1-1] First Step (Synthesis of A Block)

A styrene monomer was refined by passing an unrefined styrene monomer through a column filled with basic alumina. A solution was produced by weighing 15 g (0.144 mol) of the resulting refined styrene monomer, 69 mg (0.241 mmol) of RAFT agent, and 4.5 mg (0.0268 mmol) of azobisisobutyronitrile (AIBN) and performing mixing in a round bottom flask with a cock. Regarding the RAFT agent, S,S'-bis(α,α'-dimethyl-α''-acetic acid)trithiocarbonate was used. In this regard, the molar ratio of the styrene monomer to the RAFT agent was set to be about 600:1. Nitrogen bubbling was performed for 10 minutes, and polymerization was performed by using an oil bath at normal pressure and 130° C. under agitation at 500 rpm. After 6 hours, polymerization was completely stopped by dipping the flask into liquid nitrogen.

Tetrahydrofuran (THF) was added to the above-described solution so as to prepare an about 8 percent by weight polymer solution. The resulting solution was dropped into a large amount of methanol so as to precipitate solid polystyrene. The resulting polymer was separated by suction filtration and was sufficiently dried by vacuum drying. Thereafter, the polymer was dissolved into THF again, and was precipitated by being dropped into methanol. The operation of precipitating the polymer was performed three times in total so as to remove unreacted monomers and low-molecular-weight oligomers.

The refined polystyrene was dissolved into deuterochloroform so as to prepare an about 2 percent by weight solution, and an average degree of polymerization was determined by nuclear magnetic resonance spectrometry (NMR). The average degree of polymerization was 315. Meanwhile, the polymer was dissolved into THF so as to prepare a 0.5 percent by weight solution, and molecular weight distribution (Mw/Mn) was determined by gel permeation chromatography (GPC). Standard polystyrenes were used for molecular weight calibration. As a result, Mw/Mn was 1.12. In this regard, an eluent was set to be THF, the flow rate was set to be 1 mL/min, and the measurement was performed in the state in which three units of TSK-GEL column 4000HHR produced by Tosoh Corporation were connected.

[1-2] Second Step (Synthesis of ABA Triblock Copolymer)

The refined polystyrene included the RAFT agent in the middle portion, this was used as the RAFT agent (referred to as macro RAFT agent because the RAFT agent had a large molecular weight), and 4-vinylpyridine monomer was polymerized. The 4-vinylpyridine monomer was refined by being passed through basic alumina. A solution was prepared by weighing 11.8 g (12 mL) of the refined 4-vinylpyridine monomer, 250 mg of macro RAFT agent, 3.34 mg of azobisisobutyronitrile (AIBN), and 0.2 mg and performing mixing in a round bottom flask with a cock. The molar ratio of the 4-vinylpyridine monomer to the macro RAFT agent was set to be about 15,000:1. Subsequently, nitrogen bubbling was performed for 10 minutes, and polymerization was performed by using an oil bath at normal pressure and 75° C. under agitation at 500 rpm. After 190 minutes, polymerization was completely stopped by dipping the flask into liquid nitrogen. In this manner, the SPS triblock copolymer was produced.

Chloroform was added to the above-described solution so as to prepare an about 5 percent by weight polymer solution. The resulting solution was dropped into a large amount of hexane so as to precipitate the solid SPS triblock copolymer.

The resulting polymer was separated by suction filtration and was sufficiently dried by vacuum drying. Thereafter, the polymer was dissolved into chloroform again, and was precipitated by being dropped into hexane. The operation of precipitating the polymer was performed three times in total so as to remove unreacted monomers and low-molecular-weight oligomers and produce the refined SPS triblock copolymer.

The refined SPS triblock copolymer was dissolved into deuterochloroform so as to prepare an about 2 percent by weight solution, and an average degree of polymerization was determined by nuclear magnetic resonance spectrometry (NMR). The average degree of polymerization of the S block in total was 315, the average degree of polymerization of the P block was 1,830. Meanwhile, the SPS triblock copolymer was dissolved into DMF so as to prepare a 0.5 percent by weight solution, and molecular weight distribution (Mw/Mn) was determined by gel permeation chromatography (GPC). Standard polystyrenes were used for molecular weight calibration. As a result, Mw/Mn was 1.80. In this regard, an eluent was set to be DMF, the flow rate was set to be 1 mL/min, and the measurement was performed in the state in which three units of TSK-GEL column 4000HHR produced by Tosoh Corporation were connected.

[1-3] Third Step (Preparation of Soft Elastomer)

After 179.8 mg of the resulting SPS triblock copolymer was dissolved into 1.64 g of THF/methanol mixed solvent (mixing weight ratio of 3:2), 62 mg of tetraethylene glycol (TEG), which was a nonvolatile noncovalent solvent, was added thereto. The resulting solution was poured into a Teflon container (25 mm×10 mm×20 mm, Teflon is a registered trademark), and was left to stand at room temperature for 18 hours so as to vaporize the volatile solvent (THF, methanol). Subsequently, the volatile solvent was completely removed by performing drying at room temperature for 12 hours by using a vacuum drier so as to obtain a sample composed of only SPS and TEG (weight concentration of SPS of 74 percent by weight). The thickness of the resulting sample was 0.6 mm. The resulting sample was punched by using a punching blade die so as to prepare a strip specimen having a thickness of 0.6 mm and a width of 4 mm. Hereafter, the same strip specimen was prepared unless otherwise specified.

[2] Tensile Test

Figure 2:
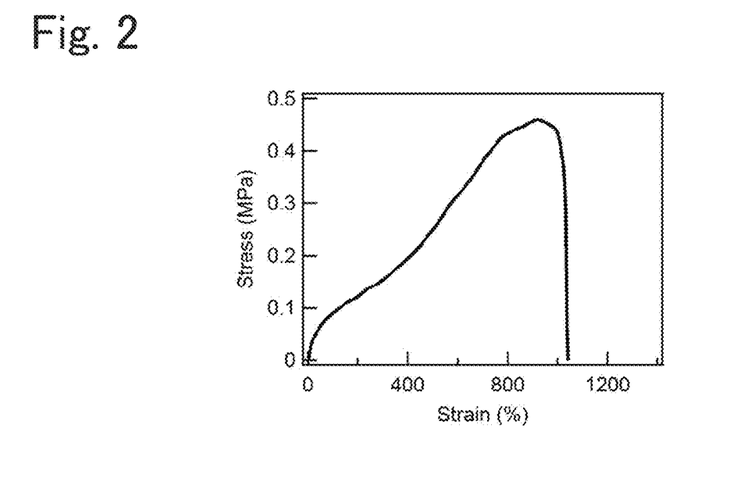
FIG. 2 is a graph showing the relationship between the strain and the stress in example 1.

The strip specimen was grasped from both sides at a spacing of 2.2 mm (spacing related to elongation of specimen) by a special jig for a tensile test, and a tensile test was performed. The measuring apparatus used was ARES-G2 produced by TA Instruments. The elongation rate was set to be 0.44 mm/s. FIG. 2 shows a graph obtained as a result of the tensile test. Table 1 shows the values of the stress (MPa) at 300% elongation, the maximum stress (MPa), and the elongation at break (%) calculated from the graph. As is clear from Table 1 and FIG. 2, example 1 had the properties of an elastomer having low modulus of elasticity, that is, a soft elastomer, where the same level of elongation (1,040%) as the elongation of Kraton D1101A (Kraton Polymers Japan Ltd., stress at 300% elongation of 2.9 MPa, maximum stress of 33 MPa, and elongation at break of 880%), which was a commercially available standard elastomer, was shown while low stress at 300% elongation (0.155 MPa) and low maximum stress (0.46 MPa) were shown. Such properties were provided because a pyridyl group of the P block in the SPS triblock copolymer and a terminal hydrogen group of TEG formed supermolecular cross-link by a hydrogen bond, and TEG functioned as a solvent of the P block. In this regard, a hydrogen bond acted between TEG and the P block and between TEG and TEG and, thereby, TEG did not ooze from the specimen. It is conjectured that the solvent ooze occurs when there are not sufficient interactions between the B block and the solvent and between the solvent and the solvent.

TABLE 1

|  | Stress at 300% elongation (Mpa) | Maximum stress (Mpa) | Elongation at break (%) |
| --- | --- | --- | --- |
| Example 1 | 0.155 | 0.46 | 1040 |
| Example 2 | 0.083 | 0.23 | 1320 |
| Example 3 | 0.061 | 0.192 | 1300 |
| Example 4 | 0.044 | 0.163 | 1310 |
| Example 5 | 0.215 | 0.683 | 750 |
| Example 6 | 0.29 | 0.334 | 740 |
| Example 7 | 1.42 | 1.42 | 380 |
| Example 8 | 0.699 | 0.807 | 360 |
| Example 9 | 0.35 | 0.47 | 480 |
| Example 10 | 0.46 | 0.52 | 380 |

Example 2

Figure 3:
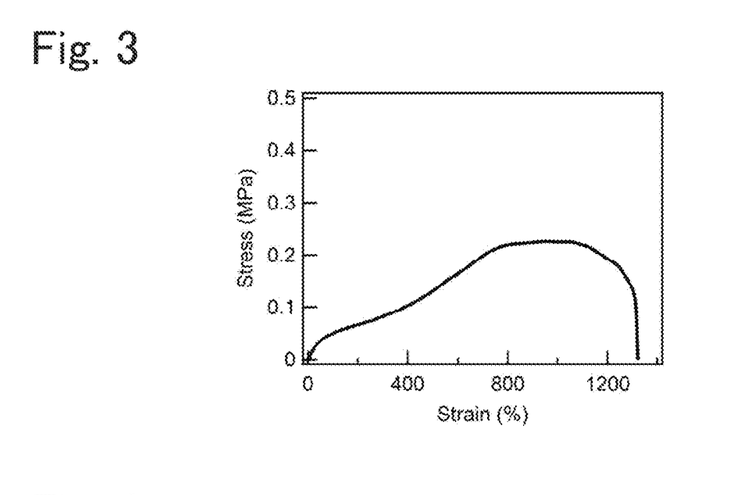
FIG. 3 is a graph showing the relationship between the strain and the stress in example 2.

In example 2, a strip specimen was produced (weight concentration of SPS of 69 percent by weight) in the same manner as in example 1 except that 168.5 mg of SPS triblock copolymer, 1.68 g of THF/methanol mixed solvent (mixing weight ratio of 3:2), and 76.9 mg of TEG were used in the third step of example 1. The tensile test was performed in the same manner as in example 1 except that the spacing related to elongation of the specimen was set to be 3.2 mm and the elongation rate was set to be 0.64 mm/s in the tensile test in example 1. Table 1 and FIG. 3 show the results thereof. As is clear from Table 1 and FIG. 3, example 2 showed the same level of elongation (1,320%) as the elongation in example 1 while showing lower stress at 300% elongation (0.083 MPa) and lower maximum stress (0.23 MPa). Therefore, it was found that example 2 had more excellent elastomer properties compared with example 1.

Example 3

Figure 4:
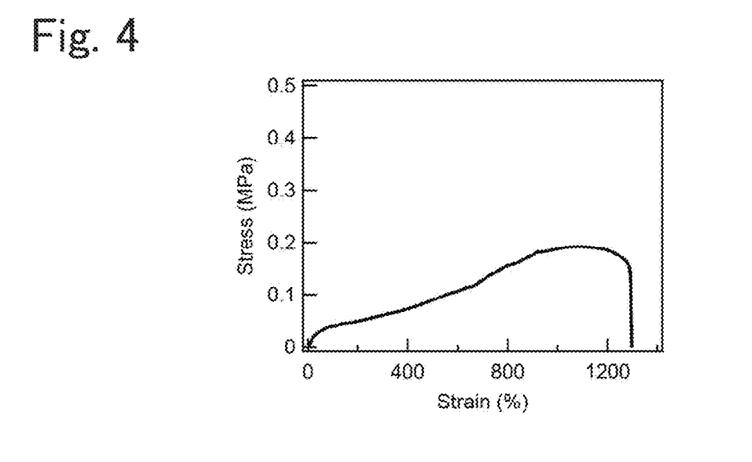
FIG. 4 is a graph showing the relationship between the strain and the stress in example 3.

In example 3, a strip specimen was produced (weight concentration of SPS of 49 percent by weight) in the same manner as in example 1 except that 118 mg of SPS triblock copolymer, 1.52 g of THF/methanol mixed solvent (mixing weight ratio of 3:2), and 122.4 mg of 1-ethylimidazolium-bistrifluoromethanesulfonylimidide (EImTFSI, also referred to as 1-ethylimidazoliumbistrifluoromethanesulfonylimide or 1-ethylimidazoliumbistrifluoromethanesulfonylamide, refer to the following formula) were used in the third step of example 1. The tensile test was performed in the same manner as in example 1 except that the spacing related to elongation of the specimen was set to be 2.7 mm, the elongation rate was set to be 0.54 mm/s, and the width of the strip specimen was set to be 2.5 mm in the tensile test in example 1. Table 1 and FIG. 4 show the results thereof. As is clear from Table 1 and FIG. 4, example 3 showed the elongation at break of 1,300% while showing low stress at 300% elongation (0.061 MPa) and low maximum stress (0.192 MPa). Therefore, it was found that example 3 had the elastomer properties. It is conjectured that example 3 had the elastomer properties in the same manner as example 1 and example 2 because EImTFSI serving as a solvent had a hydrogen-bonding proton, a hydrogen bond, that is, electrostatic dipole-dipole interaction, acted between the proton and the pyridyl group of SPS and, further, EImTFSI functioned as the solvent of the P block. It was found that even when one hydrogen-bonding proton is included in a solvent molecule, a soft elastomer resulted.

[Chem. 2]

Example 4

Figure 5:
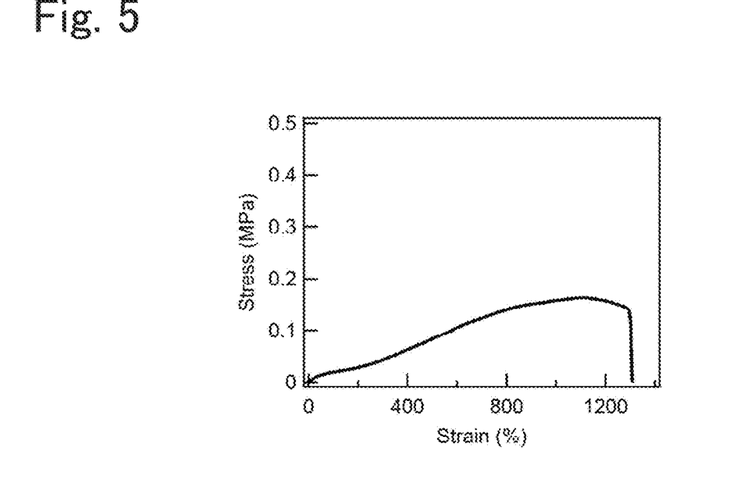
FIG. 5 is a graph showing the relationship between the strain and the stress in example 4.

In example 4, a strip specimen was produced (weight concentration of SPS of 39 percent by weight) in the same manner as in example 3 except that 99.0 mg of SPS triblock copolymer, 1.0 g of THF/methanol mixed solvent (mixing weight ratio of 3:2), and 155.3 mg of EImTFSI were used in the third step of example 3. The tensile test was performed in the same manner as in example 3 except that the spacing related to elongation of the specimen was set to be 3.9 mm, the elongation rate was set to be 0.78 mm/s, and the width of the strip specimen was set to be 4 mm in the tensile test in example 3. Table 1 and FIG. 5 show the results thereof. As is clear from Table 1 and FIG. 5, example 4 showed the elongation at break of 1,310% while showing lower stress at 300% elongation (0.044 MPa) and lower maximum stress (0.163 MPa) compared with example 3. Consequently, it was found that example 4 had more excellent elastomer properties compared with example 3.

Example 5

Figure 6:
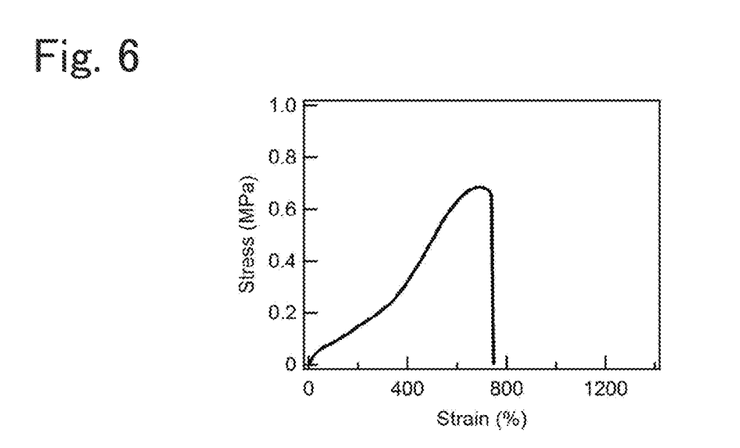
FIG. 6 is a graph showing the relationship between the strain and the stress in example 5.

In example 5, a strip specimen was produced (weight concentration of SPS of 70 percent by weight) in the same manner as in example 1 except that 170.3 mg of SPS triblock copolymer, 1.29 g of THF/methanol mixed solvent (mixing weight ratio of 3:2), and 72 mg of polyethylene glycol (PEG, produced by Dai-ichi Kogyo Seiyaku Co., Ltd.), in place of TEG, having a molecular weight of 400 and serving as a nonvolatile noncovalent solvent were used in the third step of example 1. The tensile test was performed in the same manner as in example 1 except that the spacing related to elongation of the specimen was set to be 4.8 mm, the elongation rate was set to be 0.96 mm/s, and the width of the strip specimen was set to be 4 mm in the tensile test in example 1. Table 1 and FIG. 6 show the results thereof. As is clear from Table 1 and FIG. 6, example 5 had the elastomer properties in the same manner as examples 1 to 4. Consequently, it was found that a nonvolatile liquid polymer or oligomer having a noncovalent-bonding functional group could be used as the solvent.

Example 6

Figure 7:
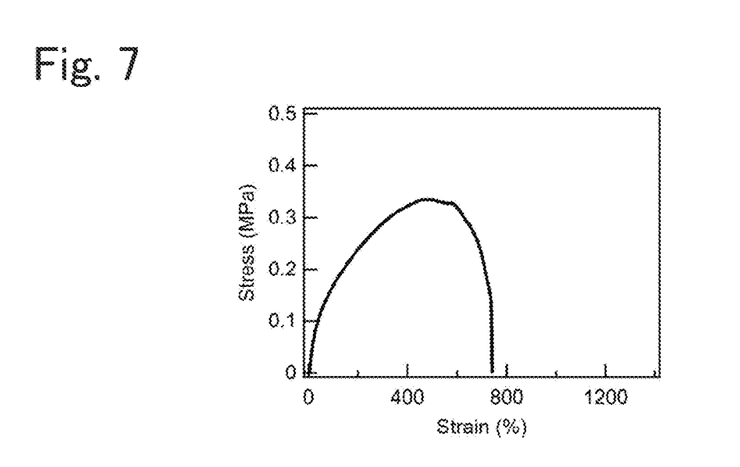
FIG. 7 is a graph showing the relationship between the strain and the stress in example 6.

In example 6, in place of synthesizing the SPS triblock copolymer through the first step and the second step of example 1, a polystyrene-b-poly(2-vinylpyridine) (referred to as SP diblock copolymer) block copolymer sample synthesized by living anionic polymerization was prepared and used in place of the SPS triblock copolymer. According to analysis by using GPC and NMR, the average degree of polymerization of polystyrene was 270, the average degree of polymerization of poly(2-vinylpyridine) was 860, and Mw/Mn was 1.1. In this regard, the SP diblock copolymer was synthesized by a method similar to the scheme reported in Macromolecules, vol. 38, pp. 4371-4376, 2005. In the third step in example 1, a strip specimen was produced (weight concentration of SPS of 79 percent by weight) in the same manner as in example 1 except that 193.4 mg of SP diblock copolymer, 1.84 g of THF/methanol mixed solvent (mixing weight ratio of 3:2), and 50.8 mg of TEG were used. The tensile test was performed in the same manner as in example 1 except that the spacing related to elongation of the specimen was set to be 4.4 mm, the elongation rate was set to be 0.88 mm/s, the width of the strip specimen was set to be 4 mm, and the thickness was set to be 0.3 mm in the tensile test in example 1. Table 1 and FIG. 7 show the results thereof. As is clear from Table 1 and FIG. 7, the elongation at break of 600% or more was shown and example 6 also had the soft elastomer properties in the same manner as examples 1 to 5. Consequently, it was found that a soft elastomer could be produced from the diblock copolymer. It is conjectured that TEG had a function of forming supermolecular cross-link of the P block and, thereby, the soft elastomer could be made without using a cross-linking type block copolymer such as the SPS triblock copolymer.

Example 7

Figure 8:
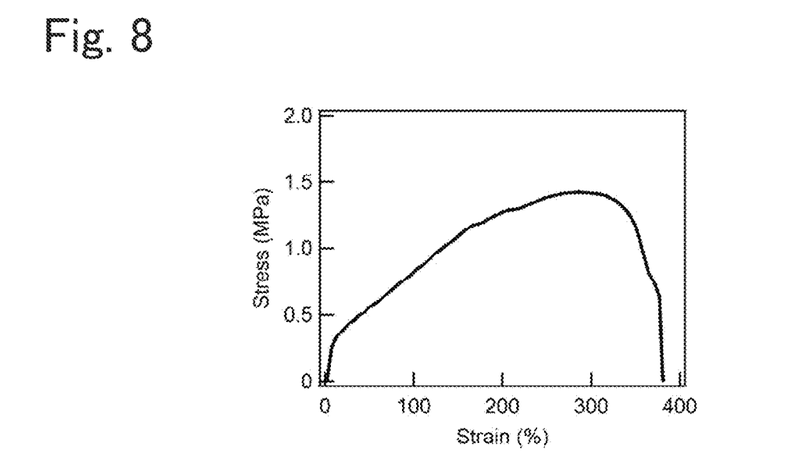
FIG. 8 is a graph showing the relationship between the strain and the stress in example 7.

In example 7, in place of synthesizing the SPS triblock copolymer through the first step and the second step of example 1, a polystyrene-b-(polymethacrylic acid-co-poly(tert-butyl methacrylate))-b-polystyrene (referred to as SMS triblock copolymer) block copolymer sample synthesized by living anionic polymerization was prepared and was used in place of the SPS triblock copolymer. The polystyrene-b-poly(tert-butyl methacrylate)-b-polystyrene triblock copolymer serving as a precursor of the SMS triblock copolymer was purchased from Polymer Source Inc., and this was treated with hydrochloric acid so as to produce the SMS triblock copolymer. According to analysis by using NMR, the average degree of polymerization of polystyrene was 1,540, the average degree of polymerization of poly(tert-butyl methacrylate) was 50, and the average degree of polymerization of polymethacrylic acid was 2,050. A strip specimen was produced (weight concentration of SP of 70 percent by weight) in the same manner as in example 1 except that 167 mg of SMS triblock copolymer, 1.35 g of pyridine, and 72.3 mg of TEG were used in the third step in example 1. The tensile test was performed in the same manner as in example 1 except that the spacing related to elongation of the specimen was set to be 5.6 mm, the elongation rate was set to be 1.2 mm/s, the width of the strip specimen was set to be 4 mm, and the thickness was set to be 1.2 mm in the tensile test in example 1. Table 1 and FIG. 8 show the results thereof. As is clear from Table 1 and FIG. 8, the elongation at break of 300% or more was shown and example 7 also had the soft elastomer properties in the same manner as examples 1 to 6. Consequently, it was found that a soft elastomer could be produced from the block copolymer not having the P block. It is conjectured that a hydrogen bond was generated between a hydroxy group of TEG and a carboxyl group of the polymethacrylic acid portion of the M block, TEG had a function as a supermolecular cross-link and a function of the solvent and, therefore, the soft elastomer could be made by generating a supermolecular cross-link due to generation of an interaction between the polymer and the solvent.

Comparative Examples 1 and 2

In comparative example 1, a sample composed of only SPS and TEG was produced (weight concentration of SPS of 48 percent by weight) in the same manner as in example 1 except that 120.4 mg of SPS triblock copolymer, 1.52 g of THF/methanol mixed solvent (mixing weight ratio of 3:2), and 132 mg of TEG were used in the third step of example 1. Meanwhile, in comparative example 2, a sample composed of only SPS and TEG was produced (weight concentration of SPS of 17 percent by weight) in the same manner as in example 1 except that 40.8 mg of SPS triblock copolymer, 1.27 g of THF/methanol mixed solvent (mixing weight ratio of 3:2), and 198.6 mg of TEG were used in the third step of example 1. Both samples were soft viscous materials and were hardly extendable. It is conjectured that when the concentration of SPS was high, the pyridyl group of SPS and the hydroxy group of TEG form a noncovalent bond and TEG had a function as a pseudo-cross-linking agent so as to produce a material having extensibility. However, it is conjectured that when the concentration of SPS was low, the concentration of TEG became relatively high, excessive TEG merely served as a medium and, therefore, did not contribute to toughness of the sample so as to produce the sample not having extensibility.

Example 8

Figure 9:
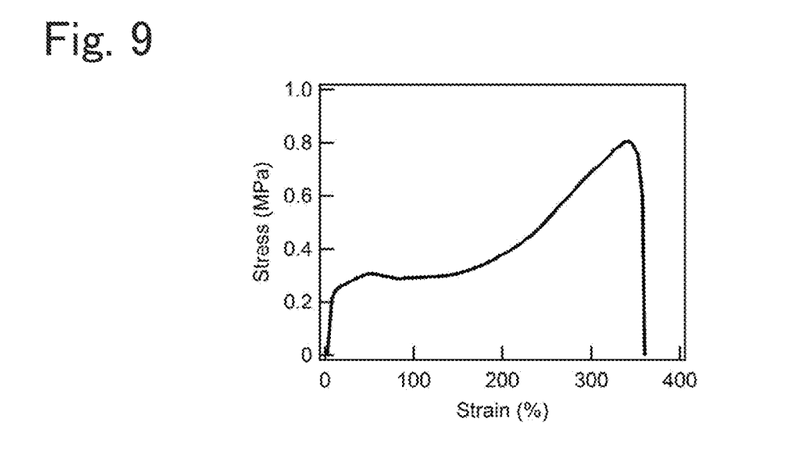
FIG. 9 is a graph showing the relationship between the strain and the stress in example 8.

In example 8, a strip specimen was produced (weight concentration of SPS of 70 percent by weight) in the same manner as in example 3 except that 171.5 mg of SPS triblock copolymer, 1.68 g of pyridine, 72.5 mg of TEG, and 5.6 mg of zinc chloride were used in the third step in example 1. The tensile test was performed in the same manner as in example 1 except that the spacing related to elongation of the specimen was set to be 7.3 mm, the elongation rate was set to be 1.46 mm/s, the width of the strip specimen was set to be 4 mm, and the thickness was set to be 0.7 mm in the tensile test in example 1. Table 1 and FIG. 9 show the results thereof. As is clear from Table 1 and FIG. 9, example 8 provided a soft elastomer showing higher stress at 300% elongation (0.699 MPa) and higher maximum stress (0.807 MPa) compared with example 2 in spite of almost the same preparation conditions except that 5.6 mg of zinc chloride was included. This is because a supermolecular cross-link was generated due to a coordination bond between a metal ion of a metal salt and the pyridyl group of the P block and, thereby, the density of the supermolecular cross-links increased. It was found that the stress at 300% elongation, the maximum stress, and the elongation at break could be adjusted by adjusting the amounts of TEG and the metal salt.

Example 9

Figure 10:
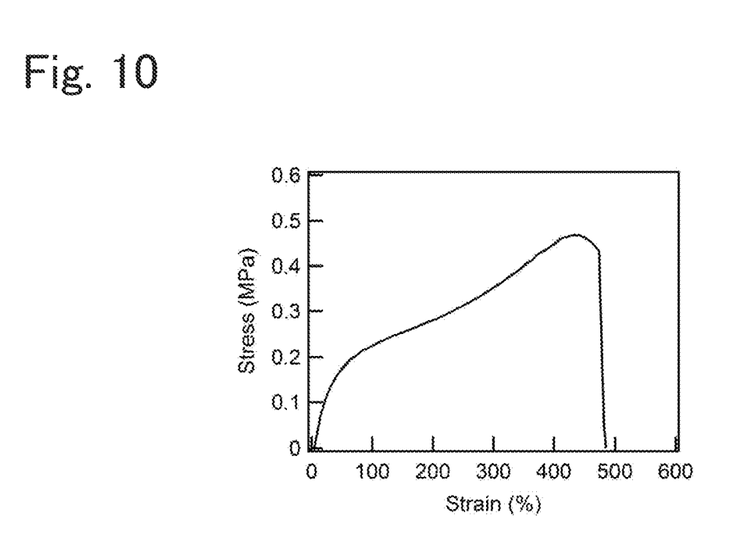
FIG. 10 is a graph showing the relationship between the strain and the stress in example 9.

In example 9, a strip specimen was produced (weight concentration of SPS of 80 percent by weight) in the same manner as in example 6 except that 192 mg of SP diblock copolymer, 1.50 g of THF/methanol mixed solvent (mixing weight ratio of 3:2), and 48.8 mg of tetraethylene glycol monomethyl ether (TEGME), in place of TEG, serving as a monoalcohol type nonvolatile noncovalent solvent were used in the third step of example 6. The tensile test was performed in the same manner as in example 1 except that the spacing related to elongation of the specimen was set to be 5.0 mm, the elongation rate was set to be 2.0 mm/s, and the width of the strip specimen was set to be 4.0 mm in the tensile test in example 1. Table 1 and FIG. 10 show the results thereof. As clearly shown in FIG. 10, in spite of no use of cross-link type block copolymer, example 9 showed elongation at break of 480%, stress at 300% elongation of 0.35 MPa, and maximum stress of 0.47 MPa and, therefore, had the elastomer properties. It is conjectured that TEGME serving as the solvent had one hydrogen-bonding proton in the molecule, a hydrogen bond, that is, electrostatic dipole-dipole interaction, acted between the proton and the pyridyl group of SP so as to generate pseudo-cross-link, TEGME further functioned as the solvent of the P block, and as a result, the properties of the soft elastomer were shown as in example 6. It was found that the hydrogen-bonding proton could produce a soft elastomer from one nonionic solvent.

Example 10

Figure 11:
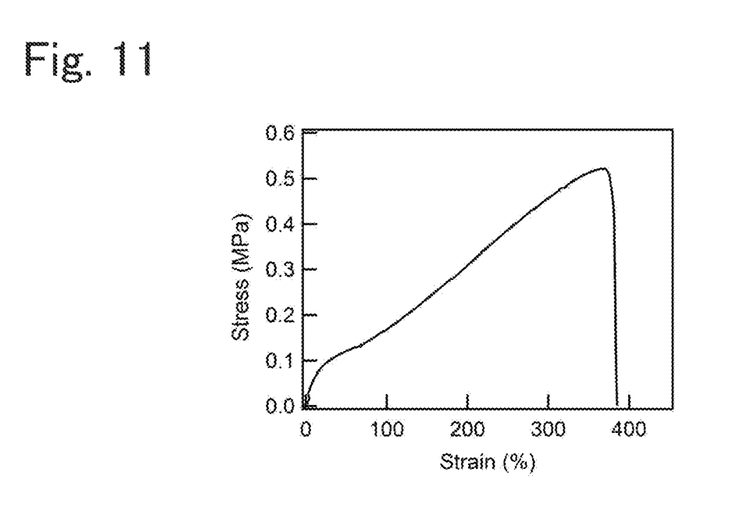
FIG. 11 is a graph showing the relationship between the strain and the stress in example 10.

In example 10, an SP diblock copolymer, in which the average degree of polymerization of polystyrene was 385 and the average degree of polymerization of poly(2-vinylpyridine) was 419, was purchased from Polymer Source Inc., and was used in place of the SP diblock copolymer in example 6. A strip specimen was produced (weight concentration of SP of 73.5 percent by weight) in the same manner as in example 6 except that 109.4 mg of SP diblock copolymer, 1.68 g of THF/methanol mixed solvent (mixing weight ratio of 3:2), 39.4 mg of TEG solution containing 0.3 M of lithium(trifluoromethylsulfonyl)imide (lithium TFSI) in place of TEG were used, 0.3 g of pyridine was further added, and standing for 24 hours on a hot plate at 60° C. was performed so as to remove THF, methanol, and pyridine by vaporization in the third step in example 6. The tensile test was performed in the same manner as in example 1 except that the spacing related to elongation of the specimen was set to be 4.2 mm, the elongation rate was set to be 0.84 mm/s, the width of the strip specimen was set to be 4.0 mm, and the thickness of the strip specimen was set to be 0.75 mm in the tensile test in example 1. Table 1 and FIG. 11 show the results thereof. As clearly shown in FIG. 11, example 10 showed elongation at break of 380%, stress at 300% elongation of 0.46 MPa, and maximum stress of 0.52 MPa although a cross-link type triblock copolymer was not used and the entire molecular weight was small. Therefore, it was considered that a soft elastomer was produced. It is conjectured that, regarding the TEG solution of lithium TFSI serving as a solvent, a hydrogen bond was formed between the pyridyl group of SP and the hydroxy group of TEG and a coordination bond was formed between the pyridyl group and a lithium ion of the lithium TFSI so as to generate a pseudo-cross-link, excess TEG functioned as a solvent for the P block and, as a result, the properties of a soft elastomer were shown in the same manner as in example 6 and example 9. It was found that a soft elastomer could be produced from the solution of the protonic solvent containing the metal salt that formed a coordination bond with the pyridyl group of the P block.

Up to this point, the examples according to the present invention have been described, but the present invention is not limited to the above-described examples.

The present application claims priority from Japanese Patent Application No. 2015-96442, filed on May 11, 2015, the entire contents of which are incorporated herein by reference.

INDUSTRIAL APPLICABILITY

The noncovalent soft elastomer according to the present invention can be utilized as materials in various industries of medical equipment, electrical products, automobiles, sporting goods, furniture, stationery, and the like.

The invention claimed is:

1. A noncovalent elastomer composition comprising:
   a block copolymer having:
      an A block that is a polymer having a glass transition temperature (Tg) of 35° C. or higher and comprises at least one selected from the group consisting of polystyrenes, polyacrylic acid esters, polymethacrylic acid esters, and polyolefins;
      a B block comprising:
         (i) at least one selected from the group consisting of polyvinylpyridines, poly(meth)acrylic acids, polyacrylamides, and polyhydroxyalkyl (meth)acrylates, or
         (ii) at least one selected from the group consisting of polystyrene derivatives, polydiene derivatives, and polyolefin derivatives, into which a functional group has been introduced, the functional group being capable of non-covalent bonding selected from hydrogen bonding, coordination bonding, and ionic bonding; and
      a solvent having a vapor pressure of 1 mmHg or less and having a property of dissolving the B block but not dissolving the A block, wherein the solvent is an alcohol-based solvent selected from the group consisting of (i) glycol-based solvents selected from trimers to tricontamers of alkylene glycol, and (ii) non-glycol-based solvents selected from monoalcohol-based solvents, diol-based solvents, and polyol-based solvents,
   wherein a strip specimen formed of the noncovalent elastomer composition, and having a thickness of 0.6 mm and a width of 4 mm, has a stress at 300% elongation in the range of from 0.044 MPa to 1.42 MPa.

2. The noncovalent elastomer composition according to claim 1, wherein the alcohol-based solvent is selected from the group consisting of dipropylene glycol; a trimer to tricontamer of alkylene glycol; a monoalcohol-based solvent; diol-based solvents selected from 1,3-propanediol, 1,4-butanediol, 1,2-butanediol, 2,3-butanediol, 1,3-butanediol, 1,5-pentanediol, 1,2-pentanediol, 1,3-pentanediol, 1,4-pentanediol, 2,3-pentanediol, 1,6-hexanediol, 1,2-hexanediol, 1,3-hexanediol, 1,4-hexanediol, 1,5-hexanediol, 2,3-hexanediol, 2,4-hexanediol, 2,5-hexanediol, 1,7-heptanediol, 1,2-heptanediol, 1,3-heptanediol, 1,4-heptanediol, 1,5-heptanediol, 1,6-heptanediol, 2,3-heptanediol, 2,4-heptanediol, 2,5-heptanediol, 2,6-heptanediol, 3,4-heptanediol, and 3,5-heptanediol; and polyol-based solvents selected from 1,2,3-propanetriol (glycerin), 1,2,3-butanetriol, and 1,2,4-butanetriol.

3. The noncovalent elastomer composition according to claim 1,
   wherein the block copolymer is a binary block copolymer composed of the A block and the B block.

4. The noncovalent elastomer composition according to claim 1,
   wherein the block copolymer is an AB block copolymer or an ABA block copolymer.

5. The noncovalent elastomer composition according to claim 1, wherein:
   the A block is at least one selected from the group consisting of polystyrenes, polyacrylic acid esters, polymethacrylic acid esters, and polyolefins,
   the B block is at least one selected from the group consisting of polyvinylpyridines, poly(meth)acrylic acids, and polyacrylamides, and
   the solvent is an ethylene glycol-based solvent having 2 to 30 oxyethylene groups.

6. The noncovalent elastomer composition according to claim 1,
   wherein the noncovalent bond is a hydrogen bond, an ionic bond, or a coordination bond.

7. The noncovalent elastomer composition according to claim 1,
   wherein the functional group is at least one selected from the group consisting of a nitrogen-containing heterocyclic group, a carboxylic acid group, an amide group, and a hydroxy group.

8. The noncovalent elastomer composition according to claim 1, wherein a weight concentration of the block copolymer in the noncovalent elastomer composition is from 49 percent by weight to 80 percent by weight.

9. The noncovalent elastomer composition according to claim 1,
   further comprising a metal salt.

10. A method for manufacturing the noncovalent elastomer composition of claim 1, comprising the steps of:
    (a) synthesizing the block copolymer, and
    (b) producing the noncovalent elastomer composition by mixing the solvent and the block copolymer.

* * * * *